US006582639B2

United States Patent
Nellis

(10) Patent No.: US 6,582,639 B2
(45) Date of Patent: Jun. 24, 2003

(54) PROCESS FOR MAKING VEHICLE HEADLINER

(75) Inventor: Todd D. Nellis, Holland, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 247 days.

(21) Appl. No.: 09/754,621

(22) Filed: Jan. 4, 2001

(65) Prior Publication Data

US 2002/0084554 A1 Jul. 4, 2002

(51) Int. Cl.[7] .......................... B29B 11/06; B29C 67/24
(52) U.S. Cl. .................. 264/119; 264/122; 264/239
(58) Field of Search ................ 264/109–128, 264/239

(56) References Cited

U.S. PATENT DOCUMENTS

| 4,663,225 A | * | 5/1987 | Farley et al. | 428/290 |
| 4,812,283 A | * | 3/1989 | Farley et al. | 264/518 |
| 4,840,832 A |   | 6/1989 | Weinle et al. |   |
| 5,071,608 A | * | 12/1991 | Smith et al. | 264/119 |
| 5,098,624 A | * | 3/1992 | Smith et al. | 264/119 |
| 5,492,580 A | * | 2/1996 | Frank | 156/72 |
| 5,591,289 A | * | 1/1997 | Souders et al. | 156/148 |
| 5,660,908 A | * | 8/1997 | Kelman et al. | 428/74 |

* cited by examiner

*Primary Examiner*—Stephen J. Lechert, Jr.
(74) *Attorney, Agent, or Firm*—Price, Heneveld, Cooper, DeWitt & Litton

(57) ABSTRACT

A vehicle headliner having a panel formed of a compressed and molded thermoplastic polymer fiber batt, wherein the fibers are thermally fused together at a multiplicity of locations to impart to the panel a self-supporting rigidity to allow the headliner to retain its shape while also rendering the panel highly deformable and resilient to allow the panel to be bent during installation and thereafter resiliently recover its original shape, is prepared by a process in which improved loft retention of the batt is achieved by appropriate selection of heating parameters and/or selection of polymeric fibers. Also, a process for achieving reduced plastic deformation and improved mechanical properties by modifying the crystallinity of the binder fibers of the batt is disclosed.

26 Claims, 2 Drawing Sheets

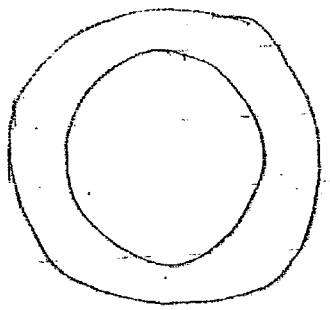
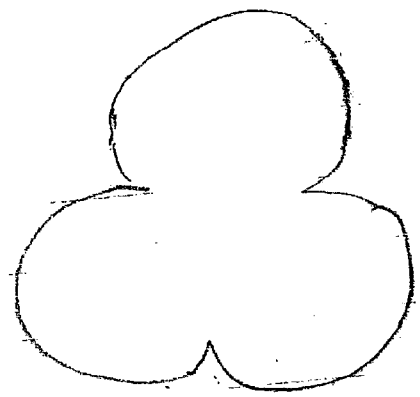
FIG. 6  FIG. 7
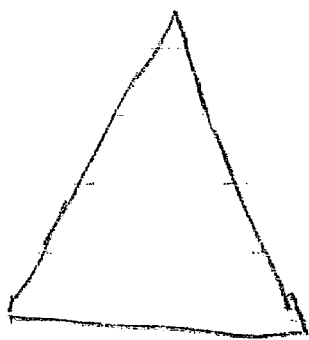
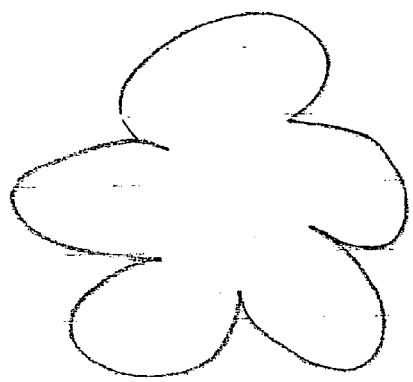
FIG. 8  FIG. 9

PROCESS FOR MAKING VEHICLE HEADLINER

FIELD OF THE INVENTION

This invention relates to automobile headliners, and more particularly to automobile headliners comprising a panel formed of a batt of polymeric fibers that is compressed and molded into a predetermined contoured shape that is resiliently flexible.

BACKGROUND OF THE INVENTION

Vehicle headliners have been fabricated from a variety of thermoformable fibrous batts comprised of inorganic fibers such as glass, natural fibers such as flax, sisal or the like, synthetic polymer fibers, and combinations of these fibers.

In the case of vehicle headliners comprising a panel formed from a batt of inorganic and/or natural fibers, shape retention has been achieved by impregnating the fibrous batt with a thermosettable resin that cures when the batt is heated. The thermoformable resin impregnated batt is heated before being compressed in a mold and/or while it is in the mold. After the resin has cured, the batt becomes relatively rigid and brittle. Because of this rigidity and brittleness, vehicle headliners comprised of fibrous batts that retain their desired shape using cured resins are subject to damage during installation, and must generally be installed through either the windshield opening or the rear window opening.

A currently preferred vehicle headliner construction that overcomes problems associated with the rigidity and brittleness of vehicle headliners comprising a panel of fibrous batt that retains its shape by virtue of cured resins is described in U.S. Pat. No. 4,840,832. This headliner utilizes a panel formed from a compressed and molded batt of polymeric fibers that are thermally fused together at a multiplicity of locations to impart to the panel a self-supporting molded rigidity to allow the headliner to retain its shape in an installed condition in a vehicle, while rendering the panel highly deformable and resilient to allow it to be flexed during installation and thereafter recover resiliently to its original molded shape. These properties enable the headliner to be bent or flexed nearly double to facilitate installation in a vehicle.

Although vehicle headliners having a panel formed from a compressed and molded batt of polymeric fibers that are thermally fused together at a multiplicity of locations are less susceptible to damage during installation than headliners using thermosettable resin binders, the thermoplastic fiber batts can exhibit excessive loss of thickness upon heating, which can prevent complete filling of the headliner mold. When this occurs, the resulting headliner does not have the desired predetermined shape, and must be scraped. Accordingly, there is a need to modify the known processes for making vehicle headliners having a polymeric fiber batt in which the polymeric fibers are thermally fused together at a multiplicity of locations, such that batt thickness loss is reduced during heating of the batt. More specifically, there is a need for modifying the process so that the polymeric fiber batt exhibits improved loft retention during heating.

Another problem with conventional vehicle headliners comprising a panel formed of a compressed and molded thermoplastic polymeric fiber batt is that the headliner is prone to plastic deformation and is still susceptible to damage and/or deformation during robust handling. Accordingly, it would be desirable to provide headliners of this type having improved mechanical properties.

SUMMARY OF THE INVENTION

It has been discovered that improved loft retention of polymeric fiber batts during heating can be achieved by appropriate selection of heating parameters and/or selection of polymeric fibers.

In accordance with one aspect of the invention, it has been determined that vehicle headliners having a panel formed of a compressed and molded thermoplastic polymeric fiber batt exhibiting improved loft retention can be achieved by heating the batt, either prior to or during the molding operation, at a temperature that is from about 20° C. below the melting temperature of the thermoplastic fibers to about 20° C. above the melting temperature of the fibers for a time sufficient to activate adhesive characteristics of the thermoplastic fibers.

In accordance with another aspect of the invention excessive loss of batt thickness during thermal processing is achieved by using thermoplastic fibers having a denier that is about 15 or higher. Thermoplastic fibers having greater cross-sectional areas exhibit greater loft retention during heating due to the increased stiffness of such fibers.

In accordance with another aspect of the invention, greater loft retention during heating is achieved by use of thermoplastic fibers having any cross-sectional geometry that imparts greater stiffness than thermoplastic fibers having a solid circular cross-sectional geometry. Preferred fiber cross-sectional geometries include hollow cross-sectional geometries, cross-sectional shapes having a plurality of rounded projections or lobes, such a trilobal or quadralobal geometry, and polygonal geometries, such a triangular, quadrilateral, or pentagonal geometries.

In accordance with another aspect of this invention, improved mechanical properties are imparted to a vehicle headliner comprising a panel formed of a compressed and molded thermoplastic polymeric fiber batt made of sheath-core bicomponent fibers having a core formed of a relatively high melting polyethylene terephthalate (PET) polymer and a sheath comprising a PET copolymer having a much lower melting temperature and exhibiting thermoplastic adhesive and thermoformability properties when heated. The improved properties are achieved by control of sheath polyester (PET) crystallization during the manufacturing process. More specifically, it has been discovered that the degree of crystallinity of the sheath polymer can be increased by appropriate thermal treatment, and that by increasing the degree of crystallinity of the sheath polymer the mechanical properties of the headliner can be improved. The resulting headliner is less prone to plastic deformation and can be handled more robustly without damage or deformation.

These and other features, advantages and objects of the present invention will be further understood and appreciated by those skilled in the art by reference to the following specification, claims and appended drawings.

BRIEF DESCRIPTION OF THE DRAWINGS

FIGS. 6–9 are cross-sectional views illustrating the cross-sectional geometry of various binder fibers that may be used in accordance with preferred embodiments of this invention.

DETAILED DESCRIPTION OF PREFERRED EMBODIMENTS

Figure 1:
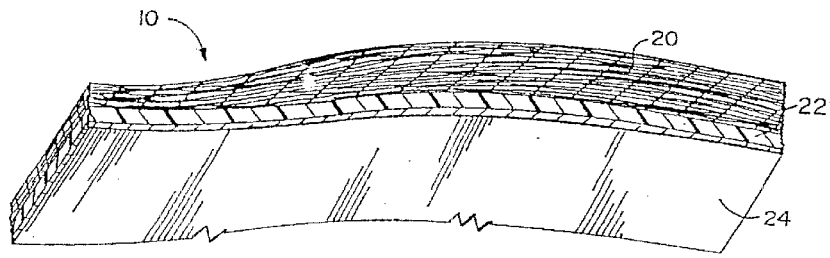
FIG. 1 is a cross-sectional view of a molded headliner in accordance with a preferred embodiment of the invention.

A molded headliner in accordance with a preferred embodiment of the invention is shown in cross section in FIG. 1. The illustrated headliner 10 includes a batt of thermoplastic fibers 20, a thin surfacing layer of a flexible foam 22 bonded to the interior surface of the batt 20 and a textile fabric layer 24 bonded to foam layer 22 and defining the interior surface of the headliner. Foam layer 22 serves to mask and smooth any surface irregularities which may be present in bail 20 and contributes to the acoustical properties of the headliner, while providing the headliner with an aesthetically pleasing interior surface. Adhesives can be used for adhering any of the layers together.

Figure 2:
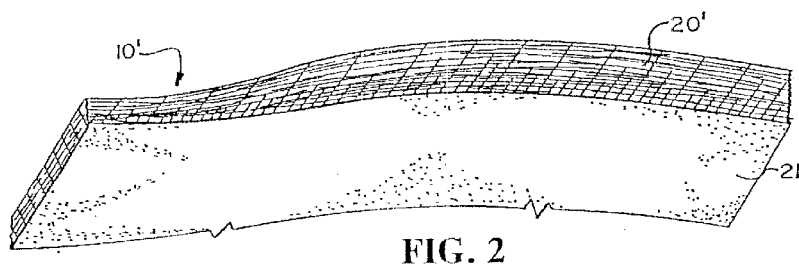
FIG. 2 is a cross-sectional view of a headliner in accordance with an alternative preferred embodiment of the invention.

A headliner 10' in accordance with an alternative embodiment of the invention is shown in FIG. 2. Headliner 10' is formed solely by the batt of fibers 20'. The innermost surface of batt 20' is comprised of textile fibers which have been fused and bonded into a desired smooth or textured surface. The surface may be dyed or printed to provide a desired color and/or pattern. Alternatively, precolored fibers may be used at the surface to give the headliner a desired color appearance. The fibers which form the exposed surface 21 of the batt may be of a different composition than those located on the interior of batt 20', and may for example comprise fibers having a greater tendency to fuse and/or flow to form a film.

Figure 3:
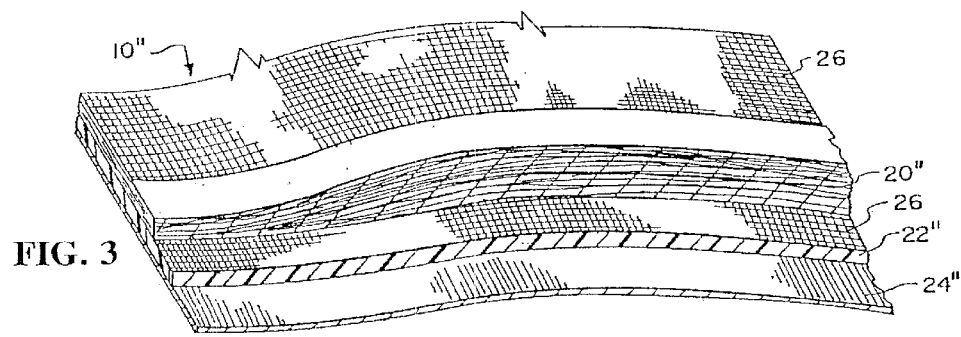
FIG. 3 is a cross-sectional view of a headliner in accordance with another preferred embodiment of the invention.

A further embodiment of a headliner 10" in accordance with the present invention is shown in FIG. 3. Headliner 10" is similar in many respects to that of FIG. 1, except that an additional scrim layer 26 is provided overlying the inner and outer surfaces of molded batt 20". Foam layer 22" and textile fabric layer 24" are similar to layers 22 and 24, respectively, described above.

If desired, added stiffness can be imparted to headliners in accordance with any of the foregoing embodiments by coating or spraying one surface with a stiffening agent, such as a moldable latex composition or a thermosetting resin. Scrim layers 26 may also in some circumstances help impart additional stiffness and shape retention.

Figure 4:
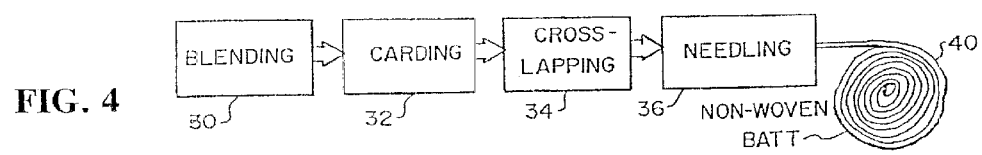
FIG. 4 is a schematic illustration showing the steps involved in producing a non-woven batt from which the headliners of this invention are formed.

FIG. 4 schematically illustrates steps involved in producing the non-woven batt from which the headliners of the present invention are formed. The thermoplastic fibers used in forming the batt are blended together as indicated at 30. This can be achieved using conventional textile blending machinery. The blended fibers are then formed into a web by suitable web-forming equipment such as by air-laying, garnetting or carding, as indicated at 32. To build up the desired thickness and basis weight, the web may be cross-lapped as indicated at 34. This can be achieved using conventional cross-lapping machinery. Optionally, the web is subjected to a needling operation 36, during which the batt is needle punched lightly to form a coherent self-sustaining batt of sufficient stability to permit it to be subsequently handled and formed into a roll 40. Alternatively, the web may be heat stabilized by passing heated air or steam through the batt.

Figure 5:
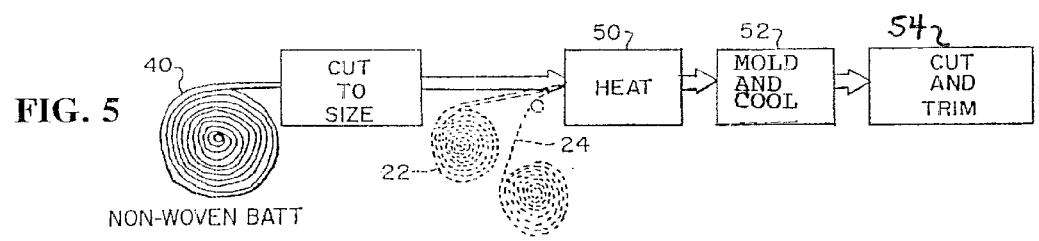
FIG. 5 is a schematic illustrating the steps involved in producing a headliner in accordance with this invention.

As illustrated in FIG. 5, roll 40 is thereafter unrolled and cut to size, and optionally combined with a foam layer 22 and a fabric surface layer 24. These materials are heated, as indicated at 50, at a temperature and for a time sufficient to activate the potentially adhesive characteristics of the thermoplastic binder fibers. The heated fibrous batt is then molded and cooled, as indicated at 52, into the desired contoured configuration. After the batt has cooled sufficiently, it is removed from the mold and cut and trimmed, as indicated at 54 into the finished size. An alternative fabrication method involves placing the batt in the mold without preheating and heating the batt to the fusion and molding temperature by forcing heated air or steam through the batt while it is in the mold.

The advantageous deformability and resiliency characteristics of the headliner are due to the thermoplastic fibers of the batt being thermally fused together at a multiplicity of locations that are sufficient in number to impart a self-supporting molded rigidity that allows the headliner to retain its shape in an installed condition while allowing deformability and resilience.

Examples of thermoplastic polymer fibers that may be used include homopolymers and copolymers of polyester, nylon, polyethylene, polypropylene and blends of fibers formed from these polymers and copolymers, with polyethylene terephthalate (PET) being preferred. Bonding of the fibers of the batt is achieved by having at least a portion of the polymeric fibers of the batt comprise potentially adhesive binder fibers. Potentially adhesive binder fibers are thermoplastic fibers that fuse with other fibers, either binder fibers or non-binder fibers, during heating step 50 and/or molding step 52. Suitable as potentially adhesive binder fibers are composite or bicomponent fibers having a relatively low melting polymer binder component and a higher melting polymer strength component. Bicomponent fibers of this type are advantageous since the strength component imparts and maintains adequate strength to the fiber while the bonding characteristics are imparted by the low melting component. A variety of bicomponent fibers of this type are commercially available from various sources. One suitable fiber for use in the invention is a sheath-core bicomponent construction wherein the core is formed of a relatively high melting polyethylene terephthalate (PET) polymer and a sheath comprising a PET polymer having a lower melting temperature and which exhibits thermoplastic adhesive and thermoformability properties when heated to a temperature of about 170 to 200° C. Another suitable bicomponent fiber comprises a high melting polyester core component and a lower melting polypropylene sheath component.

The fiber batt comprises from about 20 to 100% by weight of potentially adhesive binder fiber, optionally blended with up to about 80% by weight of one or more fibers that do not exhibit adhesive properties during thermal processing, including heating step 50 and molding step 52.

The molded batt of fibers typically has an average basis weight of about 18 to about 60 ounces per square yard. To facilitate processing in conventional textile blending, carding, cross-lapping, and needling machinery, the textile fiber should desirably have staple length of from about 1 to about 5 inches.

In building up the batt on the cross-lapper 34, several layers of fibers are deposited. It may, in some instances, be desirable to use different types and/or sizes of fibers in different layers. For example, a batt may be produced using four or five layers of fibers, with the outer layers comprising a 75/25 blend of binder fibers and non-binder fibers, and with the inner layers comprising a 50/50 blend of binder fibers and non-binder fibers. It is also possible to alter the denier as well as the composition of the fibers in different layers.

In accordance with an aspect of this invention, loft retention of the batt during the heating and/or molding steps is achieved by heating the batt at a temperature that is from about 20° C. below the melting temperature of the binder fibers to a temperature of about 20° C. above the melting temperature of the binder fibers. In those cases where a composite or bicomponent fiber is used, the melting temperature of the binder fiber is taken as the melting temperature of the polymer component having the lower melting temperature. For example, when a bicomponent binder fiber having a sheath with a melting temperature of 180° C. is used, the batt may be heated and/or molded at a temperature of from about 160° C. to about 200° C. in order to maintain improved loft retention. However, it is preferred that the polymer fiber batt is processed at a temperature from about 20° C. below the melting temperature of the binder fibers to about the melting temperature of the binder fibers. When two or more binder fibers are blended and used to form the polymeric fiber batt, the heating and/or molding steps are preferably conducted at temperatures that are within 20° C. of the melting temperature of at least a majority of the binder fibers, more preferably at least 80% of the binder fibers, and most preferably all of the binder fibers. More desirably, the heating and/or molding temperatures are from about 20° C. below the melting temperature to the melting temperature of a majority of the binder fibers, more preferably at least 80% of the binder fibers, and most preferably all of the binder fibers. By conducting the heating and/or molding steps at temperatures near, and most preferably, slightly below, the melting temperature of the binder fibers, improved loft retention of the batt is achieved. In addition, improved mechanical properties are also achieved.

In accordance with another aspect of the invention, improved loft retention of the polymeric fiber batt is achieved during heat processing (i.e., during heating step 50 and/or molding step 52) by utilizing thermoplastic fibers having a larger cross-sectional area. In general, the greater the cross-sectional area of the fibers, the greater the loft retention will be for the batt, when all other factors are the same. Thus, two batts having the same basis weight and made of the same polymeric material, but comprised of fibers having different cross-sectional areas, will exhibit different loft retention characteristics during heat processing. A greater retention of batt loft for polymeric fiber batts comprised of fibers having a larger cross-sectional area is due to the increased stiffness provided by the larger cross-sectional area fibers. Desirably, the cross-sectional area of the fibers should be as large as possible without degrading mechanical and physical properties of the formed headliner. Typically, it is desirable that the polymeric fibers have a denier per filament within the range of 15 to 20 or more. In those cases where a blend of different polymeric fibers is used to form the batt, it is desirable that at least a majority, more preferably at least 80%, and most preferably all of the fibers have a denier of at least 15.

In accordance with another aspect of this invention, it has been determined that improved loft retention of the batt during heat processing can be achieved by using fibers having a cross-sectional geometry that imparts greater stiffness than a fiber having a solid circular cross-sectional geometry. Cross-sectional geometry of the fiber influences fiber stiffness and therefore retention of batt loft during heating, either before or during molding. Examples of fiber cross-sectional geometries that impart improved loft retention of a polymeric fiber batt during heat processing are shown in FIGS. 6–9. Of the various cross-sectional geometries tested, the high void hollow circle geometry shown in FIG. 6 imparted the greatest loft retention improvement over fibers having an ordinary circular cross-sectional geometry. Other geometries that imparted improved batt loft retention during heat processing include the trilobal shape shown in FIG. 7, the delta or triangular shape shown in FIG. 8, and the pentalobal geometry shown in FIG. 9. The cross-sectional geometry of the fiber influences fiber stiffness, which in turn affects retention of batt loft during heat processing. Other examples of fiber cross-sectional geometries that impart greater stiffness than a solid circular cross-sectional geometry include other solid or hollow polygonal shapes, such as squares and other quadrilaterals, and other solid or hollow multiple lobed geometries, such as quadrilobal geometry, etc. Desirably, the fibers having a geometry that imparts greater stiffness are employed in sufficient number to improve loft retention of the batt during heat processing.

In accordance with another aspect of this invention, improved mechanical properties are imparted to a vehicle headliner comprising a panel formed of a compressed and molded thermoplastic polymeric fiber batt made of sheath-core bicomponent fibers having a core formed of a polyethylene terephthalate polymer and a sheath comprising a polyethylene terephthalate polymer having a lower melting temperature and exhibiting thermoplastic adhesive and thermoformability properties when heated. It has been determined that the degree of crystallinity of the sheath polyester has a significant influence on headliner properties. A headliner with a crystalline sheath polyester has a greater strength than a headliner with an amorphous sheath polyester. It has been shown that a headliner made in a chilled tool with forced air cooling results in the sheath polyester being in an amorphous state (non-crystalline). It has been determined that the degree of crystallinity in the sheath polyester can be controlled through appropriate thermal treatment. For example, a sheath polyester in an amorphous state can be made crystalline by exposing it to a temperature above its glass transition temperature for an appropriate amount of time. The higher the temperature is above the glass transition temperature, the faster the sheath polyester is converted from an amorphous state to a crystalline state. If the sheath polyester is heated at a rate of about 10° C. per minute, crystallization will occur at a temperature of about 60° C. If the headliner is maintained at a temperature a few degrees (e.g., 3–5° C.) above the glass transition temperature, crystallization of the sheath polyester occurs slowly and appears to be complete in about 24 hours.

One method of achieving a desired high degree of crystallinity to impart improved mechanical properties to the finished headliner is to allow the headliner to cool slowly during and after the molding operation. The temperature and flow of forced air cooling could be controlled in stages to allow slow cooling of the headliner until crystallization is complete, followed by rapid cooling of the headliner after a desired degree of crystallization is complete. Alternatively, a headliner formed with the sheath polyester in the amorphous state could be reheated for a short time to effect headliner surface crystallization (such as with an overhead bank of infrared heaters). A major benefit of achieving a high degree of crystallinity in the sheath polyester of the bicomponent fibers is that the resulting headliner has improved mechanical properties. In particular, the resulting headliner with a crystalline sheath polyester will be less prone to plastic deformation and can be handled more robustly without damage or deformation. In general, a desired degree of crystallinity in the sheath polymer may be achieved by utilizing the bicomponent fibers to form a headliner having a compressed and molded batt as described above, followed by a thermal processing step in which the headliner is heated to a temperature above the glass transition temperature of the sheath polymer of the bicomponent fibers for a time sufficient to achieve a desired degree of crystallinity.

In an alternative process, a headliner having a compressed and molded polymeric fiber batt comprised of bicomponent polyethylene terephthalate fibers is prepared as generally described above. However, after the molding step 52, rather than allowing the thermoformed headliner to be rapidly cooled, it is cooled at a controlled rate, such that the sheath polyester in the bicomponent fibers is converted from an amorphous state to a crystalline state, such cooling being controlled so that the sheath polyester has a degree of crystallinity of at least 25%, more preferably at least 50%, and even more preferably at least 75%.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A process of making a vehicle headliner having a panel formed of a compressed and molded thermoplastic polymeric fiber batt wherein the fibers are thermally bonded together at a multiplicity of locations to impart to the panel a self-supporting rigidity to allow the headliner to retain its shape while also rendering the panel highly deformable and resilient to allow the panel to be bent during installation and thereafter resiliently recover its original shape, and wherein the batt exhibits high fiber loft retention during heating, comprising:
   forming a batt comprised of thermoplastic fibers, at least a portion of the polymeric fibers of the batt being potentially adhesive binder fibers;
   heating the batt at a temperature that is from about 20° C. below the melting temperature of the adhesive binder fibers to about 20° C. above the melting temperature of the adhesive binder fibers; and
   molding the batt into a desired contoured vehicle headliner configuration.

2. The process of claim 1, wherein the batt is cooled during the molding step.

3. The process of claim 1, wherein the batt is heated to a temperature that is from about 20° C. below the melting temperature of the potentially adhesive binder fibers to the melting temperature of the potentially adhesive binder fibers.

4. The process of claim 3, wherein the potentially adhesive binder fibers are sheath-core bicomponent fibers having a polyethylene terephthalate core polymer and a polyethylene terephthalate sheath polymer having a lower melting temperature than the core polymer.

5. The process of claim 1, wherein the potentially adhesive binder fibers comprise at least 20% of the fiber batt by weight.

6. The process of claim 1, wherein the potentially adhesive binder fibers have a denier of at least 15.

7. The process of claim 1, wherein the potentially adhesive binder fibers have a cross-sectional geometry that imparts greater stiffness than a fiber having a solid circular cross-sectional geometry.

8. The process of claim 7, wherein the potentially adhesive binder fibers have a hollow cross-sectional geometry.

9. The process of claim 7, wherein the potentially adhesive binder fibers have a polylobal cross-sectional geometry.

10. The process of claim 7, wherein the potentially adhesive binder fibers have a trilobal cross-sectional geometry.

11. The process of claim 7, wherein the potentially adhesive binder fibers have a polygonal cross-sectional geometry.

12. The process of claim 7, wherein the potentially adhesive binder fibers have a triangular cross-sectional geometry.

13. A process of making a vehicle headliner having a panel formed of a compressed and molded thermoplastic polymeric fiber batt wherein the fibers are thermally bonded together at a multiplicity of locations to impart to the panel a self-supporting rigidity to allow the headliner to retain its shape while also rendering the panel highly deformable and resilient to allow the panel to be bent during installation and thereafter resiliently recover it original shape, and wherein the batt exhibits high fiber loft retention during heating, comprising:
   forming a batt comprised of thermoplastic fibers, at least 20% of the thermoplastic fibers being potentially adhesive binder fibers;
   heating the batt at a temperature and for a time that are sufficient to activate adhesive characteristics of the binder fibers; and
   molding the batt into a desired contoured configuration, said binder fibers having a cross-sectional geometry that imparts greater stiffness than a binder fiber having a solid circular cross-sectional geometry.

14. The process of claim 13, wherein the batt is cooled during the molding step.

15. The process of claim 13, wherein the batt is heated to a temperature that is from about 20° C. below the melting temperature of the potentially adhesive binder fibers to the melting temperature of the potentially adhesive binder fibers.

16. The process of claim 15, wherein the potentially adhesive binder fibers are sheath-core bicomponent fibers having a polyethylene terephthalate core polymer and a polyethylene terephthalate sheath polymer having a lower melting temperature than the core polymer.

17. The process of claim 13, wherein the potentially adhesive binder fibers comprise at least 20% of the fiber batt by weight.

18. The process of claim 13, wherein the potentially adhesive binder fibers have a denier of at least 15.

19. The process of claim 13, wherein the potentially adhesive binder fibers have a hollow cross-sectional geometry.

20. The process of claim 13, wherein the potentially adhesive binder fibers have a polylobal cross-sectional geometry.

21. The process of claim 13, wherein the potentially adhesive binder fibers have a trilobal cross-sectional geometry.

22. The process of claim 13, wherein the potentially adhesive binder fibers have a polygonal cross-sectional geometry.

23. The process of claim 13, wherein the potentially adhesive binder fibers have a triangular cross-sectional geometry.

24. A process of making a vehicle headliner having a panel formed of a compressed and molded thermoplastic polymeric fiber batt wherein the fibers are thermally bonded together at a multiplicity of locations to impart to the panel a self-supporting rigidity to allow the headliner to retain its shape while also rendering the panel highly deformable and resilient to allow the panel to be bent during installation and thereafter resiliently recover its original shape, and wherein the vehicle headliner exhibits low plastic deformation and can be handled more robustly without damage or deformation, comprising:

forming a batt comprised of thermoplastic fibers, at least 20% of the fibers being potentially adhesive binder fibers, the binder fibers being core-sheath bicomponent fibers including a polyethylene terephthalate core polymer and a polyethylene terephthalate sheath polymer having a lower melting temperature than the core polymer;

heating the batt at a temperature and for a time sufficient to activate adhesive characteristics of the binder fibers;

molding the batt into a desired contoured vehicle headliner configuration; and subjecting the molded batt to a temperature above the glass transition temperature of the sheath polymer for a time sufficient to increase the degree of crystallinity of the sheath polymer.

25. The process of claim 24, wherein the batt is cooled during the molding step.

26. The process of claim 24, wherein the batt is subject to the temperature above the glass transition temperature of the sheath polymer for a time sufficient to increase the degree of crystallinity of the sheath polymer after the batt is molded.

* * * * *

UNITED STATES PATENT AND TRADEMARK OFFICE
CERTIFICATE OF CORRECTION

PATENT NO.    : 6,582,639 B2
DATED         : June 24, 2003
INVENTOR(S)   : Todd D. Nellis et al.

It is certified that error appears in the above-identified patent and that said Letters Patent is hereby corrected as shown below:

Title page,
Item [12], after "Nellis" insert -- et al. --.
Item [75], Inventor, after "MI" insert -- Paul E. Thoma, Cedarburg, WI --.

Column 2,
Line 31, "a" should be -- as --.

Column 3,
Line 17, "bail" should be -- batt --.

Signed and Sealed this

Seventh Day of October, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,582,639 B2
DATED : June 24, 2003
INVENTOR(S) : Todd D. Nellis et al.

It is certified that error appears in the above-identified patent and that said Letters Patent is hereby corrected as shown below:

Title page,
Item [75[, Inventors, after "(US)" insert -- Bobby D. Bagby, Zeeland, MI (US); Paul E. Thoma, Cedarburg, WI (US) --.

Signed and Sealed this

First Day of June, 2004

JON W. DUDAS
*Acting Director of the United States Patent and Trademark Office*